United States Patent
Hähnel et al.

(10) Patent No.: US 6,698,576 B2
(45) Date of Patent: Mar. 2, 2004

(54) METHOD AND DEVICE FOR TRANSFERRING A PRODUCT IN A PACKAGING MACHINE

(75) Inventors: Bernd Hähnel, Stutensee (DE); Richard Christ, Emmelshausen (DE)

(73) Assignee: IWK Verpackungstechnik GmbH, Stutensee (DE)

( * ) Notice: Subject to any disclaimer, the term of this patent is extended or adjusted under 35 U.S.C. 154(b) by 0 days.

(21) Appl. No.: 10/344,988

(22) PCT Filed: Sep. 22, 2001

(86) PCT No.: PCT/EP01/10960
§ 371 (c)(1),
(2), (4) Date: Feb. 20, 2003

(87) PCT Pub. No.: WO02/26601
PCT Pub. Date: Apr. 4, 2002

(65) Prior Publication Data
US 2003/0159903 A1 Aug. 28, 2003

(30) Foreign Application Priority Data
Sep. 26, 2000 (DE) .......................... 100 48 007

(51) Int. Cl.$^7$ .................................. B65G 29/00
(52) U.S. Cl. .................... 198/469.1; 198/725; 198/728; 53/447; 53/531
(58) Field of Search ............... 198/469.1, 725, 198/726, 727, 728, 729, 730, 475.1, 474.1, 476.1; 53/443, 447, 531, 535, 540

(56) References Cited

U.S. PATENT DOCUMENTS

| | | | |
|---|---|---|---|
| 3,533,496 A | 10/1970 | Atwood | |
| 4,375,845 A | * 3/1983 | Chambers et al. | 198/570 |
| 4,625,857 A | * 12/1986 | Kuehl | 198/465.1 |
| 4,637,509 A | 1/1987 | Raudat | |
| 4,708,237 A | 11/1987 | Buisson | |
| 4,883,161 A | * 11/1989 | Focke | 198/347 |
| 5,048,671 A | * 9/1991 | Ellsworth | 198/728 |
| 5,167,317 A | * 12/1992 | Van Der Schoot et al. | 198/469.1 |
| 5,657,615 A | 8/1997 | Muller | |

FOREIGN PATENT DOCUMENTS

| | | |
|---|---|---|
| CH | 410 759 | 10/1966 |
| DE | 17 56 031 | 4/1970 |
| DE | 20 58 713 | 6/1971 |
| DE | 31 44 449 | 8/1982 |
| DE | 42 07 725 | 9/1993 |
| DE | 198 12 248 | 7/1999 |
| EP | 0 983 941 | 3/2000 |

* cited by examiner

Primary Examiner—Christopher P. Ellis
Assistant Examiner—Rashmi Sharma
(74) Attorney, Agent, or Firm—Paul Vincent

(57) ABSTRACT

In a method for transferring a product in a packaging machine, the product is engaged from behind by a pushing element which is mounted on and driven by a first circulating continuous conveyor and moved from a transfer station along a sliding surface for transfer to an ongoing conveyor device. While being moved, the product is guided between the pushing element and a forward limiting element which is mounted on a second circulating continuous conveyor. To ensure a precise, rapid transfer, the forward limiting element is returned to the transfer station after the product has been moved by the carrying run of its second continuous conveyor and is used as the pushing element for the next product to be moved. The pushing element is guided back to the transfer station in the opposite direction to that in which the product is conveyed by means of its first continuous conveyor and is used as the limiting element for the next product to be moved.

6 Claims, 5 Drawing Sheets

METHOD AND DEVICE FOR TRANSFERRING A PRODUCT IN A PACKAGING MACHINE

BACKGROUND OF THE INVENTION

The invention concerns a transfer device in a packaging machine in accordance with the independent claim.

In a packaging machine, the products and the packages, which can be e.g. folding boxes, must pass several stations either individually or as a unit with the product accommodated in the package. In the sense of the application, the term product means each individual product and also a stack of individual products, e.g. blister strips handled as a unit.

Endless chain or conveyor belts are often used as a transport device within the packaging machine, wherein the packages and/or the products are supplied on the upper run. The following discussion is based, by way of example, on the transfer of a blister stack, consisting of several blister strips disposed on top of each other on a product conveyor belt.

The individual blisters are disposed on top of each other in a stacking station to form a blister stack and are then transferred to the product conveyor belt via a transfer device (EP 0 876 278 B1). The transfer device comprises a sliding surface, one end of which accommodates, in a transfer station, the blister stack which is to be transferred. At a separation above the sliding surface, an endless conveyor is provided which circulates in a vertical plane and carries several projecting fingers circulating with the endless conveyor. To displace the blister stack across the sliding surface, a finger can engage behind the blister stack and carry it while moving along the lower run of the endless conveyor. At the end of the sliding surface, the blister stack is pushed onto the product conveyor belt and is disposed, in particular, in a compartment formed thereon, thereby terminating the transfer.

This type of displacement of the blister stack over the sliding surface has various disadvantages. On the one hand, the finger must be positioned very precisely relative to the blister stack to avoid eccentric introduction of the pushing force and thereby jamming or disalignment of the blister stack. Since the width of the blister stacks to be moved by the transfer device varies depending on the size of the respective blister strips, the position of the fingers must always be re-oriented when the product is changed, which is demanding and laborious. Moreover, there is the risk that the blister stacks are released from the finger during sudden stoppage of the transfer device due to their inertial force to continue to slide over the sliding surface through a short stretch, without guidance, wherein they usually lose their predetermined orientation and must be removed from the packaging machine by an operator to guarantee proper operation when the transfer device is restarted.

In CH 410 759, which discloses a means of this type, a stack of products is inserted into a continuous transport channel by means of a multi-component push arm which is mounted to a first circulating endless conveyor. The transport channel is associated with a second circulating endless conveyor which carries transport straps for displacing the product stack along the transport channel after the push arm has pushed the stack into the transport channel. The speed and orientation of the push arm and the transport straps are adjusted such that the product stack is loaded on its rear side by the push arm at the end of the effective transport path of the first endless conveyor of the push arm, while its front side abuts the advancing transport strap such that a momentary state is thereby achieved in which the product stack is received between two elements.

Such a transfer also involves the above-mentioned drawbacks since the product stack is only in contact with the push arm along nearly the entire displacement path.

It is the underlying purpose of the invention to produce a method and a device for transferring a product in a packaging machine which eliminates the above-mentioned disadvantages to transfer the product with high precision.

SUMMARY OF THE INVENTION

This object is achieved in accordance with the invention with the device having the characterizing features of the independent claim.

In accordance with the invention, the pushing motion of the product or of the blister stack is achieved in a conventional manner via the pushing element which engages behind the product, which may be one or more adjacent fingers or also a push plate. During its entire displacement, the product is guided between the pushing element and the advancing limiting element, preferably with tight fit. The advancing limiting element which can also be one or more adjacent fingers or a limiting plate, prevents the product from being released from the pushing element during sudden stoppage of the transfer device to continue to slide in an uncontrolled fashion. Moreover, the limiting element prevents, in cooperation with the pushing element, inclined positioning of the product, since the product is precisely positioned between the pushing element and the limiting element. The separation between the pushing element and the limiting element can be selected such that the product is clamped between these elements with slight pretension. However, the separation between the pushing element and the limiting element preferably corresponds exactly to the width of the product such that it is held between the two elements without any tension.

To achieve high efficiency with the transfer device, a new product or a new blister stack should be introduced during times at which the previous product is still being displaced. To be able to receive the provided product quickly and securely between the pushing element and the limiting element, the invention provides that the advancing limiting element is returned to the transfer station, after termination of displacement of the product, by means of its first endless conveyor and, in particular, via its upper run to serve as pushing element for the next product to be displaced, which is already disposed in the transfer station, by abutting the rear side thereof. The pushing element used for the previous product is returned to the transfer station against the product transport direction by means of its second endless conveyor and, in particular, via its lower run and abuts the front side of the provided product at that location such that it serves as a limiting element for same during the displacement process. In this manner, the fingers of the one endless conveyor and the fingers of the other endless conveyor are alternately used as pushing element and as limiting element, respectively.

It has been demonstrated that an eccentric disposition of the pushing element relative to the product, i.e. eccentric introduction of the pushing force, does not disalign the product due to the limiting element, since the torque resulting from such eccentricity is accommodated for by the limiting element in cooperation with the pushing element. In this fashion, demanding centering of the pushing element relative to the product is not required.

When the format is changed, the separation between the pushing element and the limiting element must merely be adjusted to the width of the new product. Towards this end, the pushing element and the limiting element are advantageously mounted to different endless conveyors which can be adjusted relative to each other. The two endless conveyors are preferably driven independently of each other, wherein the drive motions are synchronized during the entire displacement process of the product to maintain the predetermined separation between the pushing element and the limiting element.

The above-mentioned object is achieved in a device having the characterizing features of the independent claim. The limiting element which advances the product is mounted to the second circulating endless conveyor and is driven thereby, wherein the product is guided between the pushing element and the limiting element, preferably with close tolerance. The pushing element and the limiting element are thereby mounted to different endless conveyors, each of which is preferably provided with its own drive device such that, after termination of displacement of a product in the above-mentioned manner, different return motions for the elements can be provided.

The endless conveyors are preferably disposed above the sliding surface and each circulate parallel to another in a vertical plane.

In accordance with the invention, each endless conveyor can be driven in two directions as a result of which, after termination of the displacement process of a product, the advancing limiting element can be returned, in particular via the upper run of its endless conveyor, to the transfer station while the pushing element is returned to the transfer station against the product transport direction, in particular, via the lower run of its endless conveyor. For the next product to be displaced, the elements thereby swap function, i.e. the previous limiting element becomes the pushing element while the previous pushing element assumes the function of the limiting element.

Further details and features of the invention can be extracted from the following description of embodiments with reference to the enclosed drawing.

DESCRIPTION OF THE PREFERRED EMBODIMENT

Figure 2:
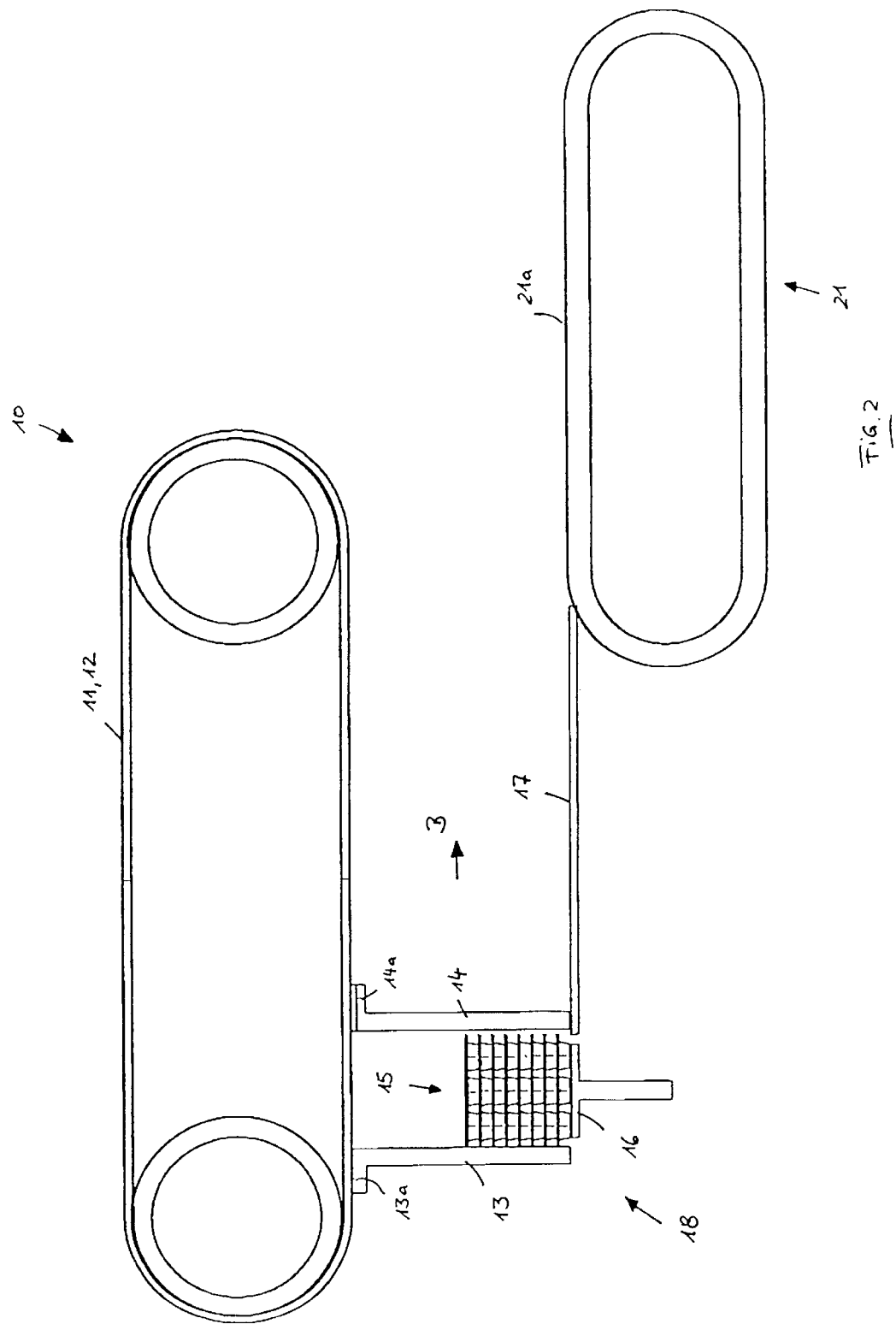
FIG. 2 shows the schematic representation of the inventive transfer device in a starting position.

FIG. 2 shows a schematic side view of an inventive transfer device 10 in a packaging machine. It shows, in a conventional fashion which is not further explained herein, a product in the form of a blister stack 15 in a transfer station 18 which comprises an elevating platform 16. The elevating platform 16 is joined at the same level by a sliding surface 17 which is positioned at its opposite end close to the upper run 21a of a continuous transport device 21 which is e.g. the product transport chain of a packaging machine. The blister stack 15 is to be displaced from the elevating platform 16, via the sliding surface 17, to the continuous transport device 21 and be pushed onto its upper run 21a.

Figure 1:
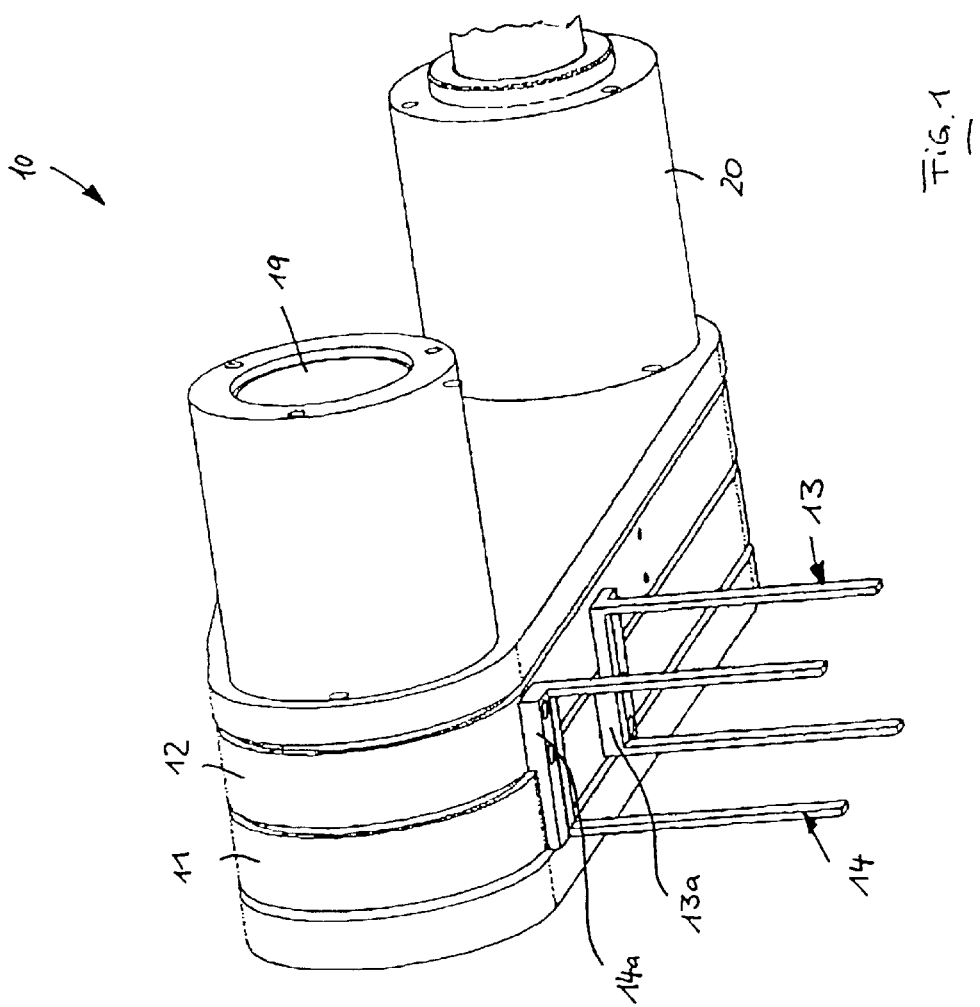
FIG. 1 shows a perspective lower view of the endless conveyor.

To perform the displacement motion, two circulating endless conveyors 11, 12 are provided at a separation above the sliding surface 17 which circulate parallel and next to another in a vertical plane (FIG. 1). Each of the two endless conveyors 11, 12 has its own drive device 19, 20 and the endless conveyors 11, 12 can be driven in two directions, independent of one another. The first endless conveyor 11 is provided, via a mounting section 13a, with the base of a U-shaped finger fork 13 which opens towards the bottom and circulates with the first endless conveyor 11 and which extends sidewardly to above the parallel second endless conveyor 12. A similar U-shaped second finger fork 14 is mounted to the second endless conveyor 12 via a mounting section 14a, which extends sidewardly up to the region of the first endless conveyor 11 and is oriented towards the first finger fork 13 in the direction of motion of the endless conveyors 11 and 12.

FIG. 2 shows the original position of a transfer or displacement process for the blister stack 15 which is to be displaced to the continuous transport device 21 via the sliding surface 17 in the direction B. The first finger fork 13 abuts the rear side of the blister stack 15, viewed in the direction of motion B, and serves as pushing element. The second finger fork 14 is mounted to the opposite front side of the blister stack 15, viewed in the direction of motion B, such that the blister stack 15 is disposed between the two finger forks 13 and 14 with tight fit and little play.

At the start of the transfer process, the two endless conveyors 11 and 12 and therefore the finger forks 13 and 14 are synchronously driven in the same direction B thereby exerting a pushing force onto the blister stack 15 in the direction of B via the finger fork 13 acting as pushing element, the pushing force displacing the blister stack 15 from the elevating platform 16 onto and across the sliding surface 17. The advancing finger fork 14 which acts as limiting element thereby prevents the blister stack 15 from slanting or being released from the trailing finger fork 13.

Figure 3:
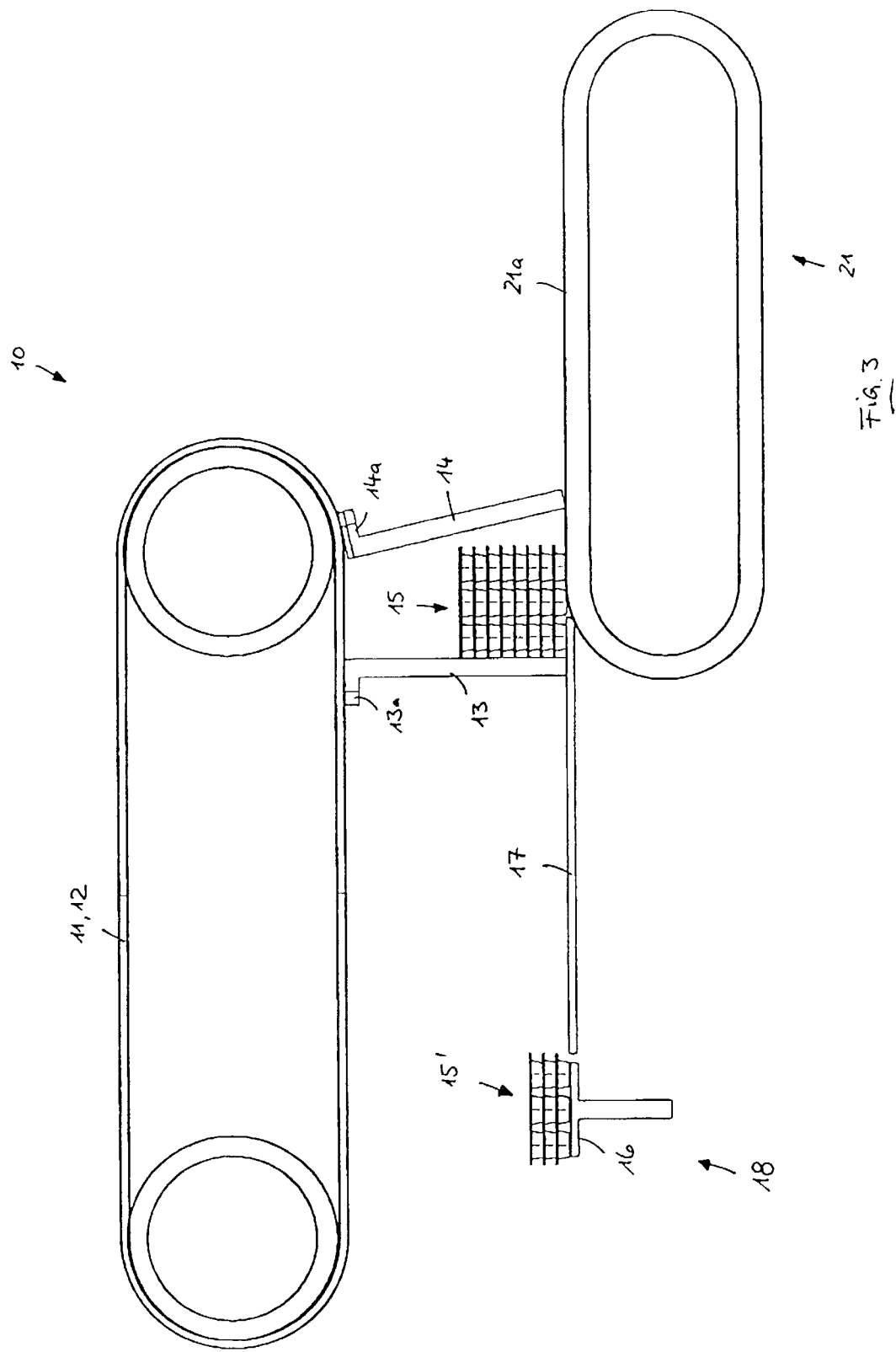
FIG. 3 shows the transfer station according to FIG. 2 at the end of the displacement process.

The synchronized motion of the two endless conveyors 11 and 12 continues until the blister stack 15 has been pushed onto the upper run 21a of the continuous transport device 21 such that it is accepted thereby (see FIG. 3). While the blister stack 15 is displaced across the sliding surface 17, the next blister stack 15' is stacked onto the elevating platform 16.

Figure 4:
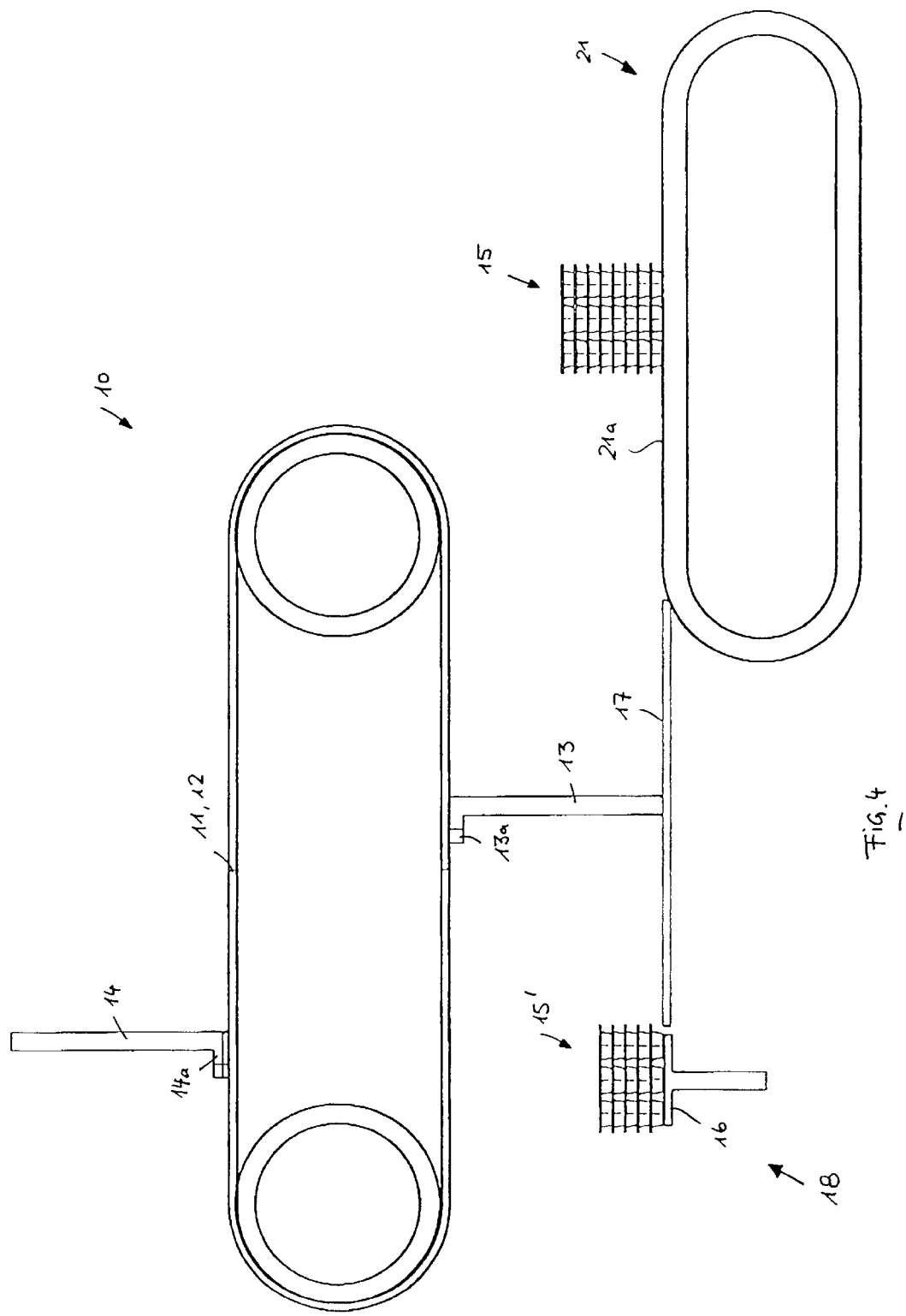
FIG. 4 shows the transfer station in accordance with FIGS. 2 and 3 during return motion of the fingers.

From the transfer position to the continuous transport device 21 (see FIG. 3) the finger forks 13 and 14 must be returned to the transfer station 18. This is effected through different motions of the endless conveyors 11 and 12. The advancing finger fork 14 is returned via the upper run of the second endless conveyor 12 (see FIG. 4) and then abuts the rear side of the new blister stack 15' disposed on the elevating platform 16 (see FIG. 5). In this fashion, the finger fork 14 which is used as the upstream limiting element for the blister stack 15, is used as the trailing pushing element for the subsequent blister stack 15'.

Figure 5:
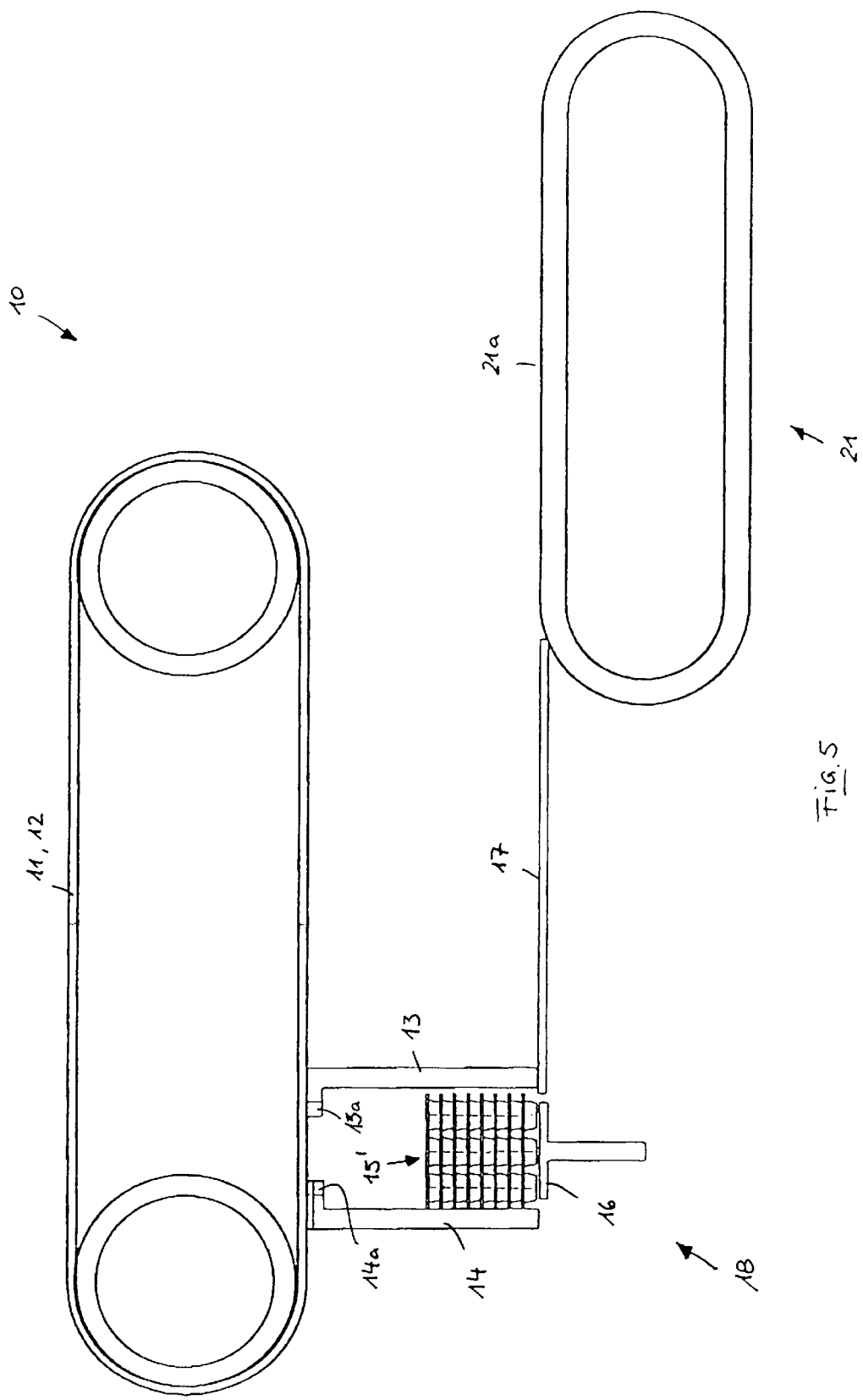
FIG. 5 shows the transfer station in a starting position for the subsequent product to be displaced.

The finger fork 13 which serves as pushing element for the blister stack 15 is returned to the transfer station 18 by reversing the direction of motion of the first endless conveyor 11 (see FIG. 4) to abut the front side of the blister stack 15' which is prepared for displacement. The finger fork 13 used up to now as pushing element for the blister stack 15, now serves as upstream limiting element for the subsequent blister stack 15'. FIG. 5 shows the position of the finger forks 13 and 14 after return to the transfer station 18. The constellation shown therein corresponds substantially to the starting position of FIG. 2, with the two finger forks 13 and 14 simply being exchanged. From the position shown in FIG. 5, the blister stack 15' is transferred to the continuous transport device 21 in the manner described, whereupon the two finger forks 13 and 14 are returned while thereby interchanging their functions.

We claim:

1. A transfer device in a packaging machine for displacing a product from a transfer station along a sliding surface to a continuous transport device, the transfer device comprising:
   a first circulating endless conveyor having an first upper run and a first lower run, said first endless conveyor circulating in a substantially vertical plane above the sliding surface;
   a first drive mechanism cooperating with said first endless conveyor to drive said first endless conveyor in two directions;
   a second circulating endless conveyor having a second upper run and a second lower run, said second endless conveyor circulating in a substantially vertical plane, above the sliding surface and parallel to said first endless conveyor;
   a second drive mechanism cooperating with said second endless conveyor to drive said second endless conveyor in two directions;
   a first U-shaped finger fork mounted to said first circulating endless conveyor, said first fork having a first fork end facing away from said first endless conveyor which is open; and
   a second U-shaped finger fork mounted to said second circulating endless conveyor, said second fork having a second fork end facing away from said second endless conveyor which is open, wherein, in a first transfer process, the product is disposed between said first fork and said second fork, said first fork pushing the product and said second fork disposed upstream of the product to limit forward motion of the product, wherein after transport of the product to the transport device, the first fork is returned to the transfer station along said first lower run, against a transport direction of the product, to assume a position upstream of a next product to be transferred and said second fork is returned to the transfer station along said second upper run to assume a pushing location behind said next product to be transferred.

2. The transfer device of claim 1, wherein said first and said seond finger forks are oriented substantially vertically during displacement of the product.

3. The transfer device of claim 1, wherein the product can be received between said first and second finger forks with tight fit during its entire displacement motion.

4. The transfer device of claim 1, wherein a separation between said first and said second finger forks is selected to hold the product between said first and second forks with slight pre-tensioning during its entire displacement motion.

5. The transfer device of claim 1, wherein said first and said second drive mechanisms can be synchronized to maintain a predetermined separation between said first and said second finger forks during transport of the product.

6. The transfer device of claim 1, wherein said first and said second endless conveyors can be adjusted relative to each other.

* * * * *